United States Patent [19]

Sextl et al.

[11] Patent Number: 5,236,758

[45] Date of Patent: Aug. 17, 1993

[54] HEAT INSULATOR AND METHOD OF MAKING SAME

[75] Inventors: Gerhard Sextl, Geiselbach; Roland Reuter, Darmstadt; Hans Strack, Alzenau; Peter Kleinschmit, Hanau; Rudolf Schwarz, Alzenau-Wasserlos, all of Fed. Rep. of Germany

[73] Assignee: Degussa AG, Fed. Rep. of Germany

[21] Appl. No.: 669,738

[22] Filed: Mar. 15, 1991

[30] Foreign Application Priority Data

Mar. 16, 1990 [DE] Fed. Rep. of Germany ....... 4008480
Sep. 17, 1990 [DE] Fed. Rep. of Germany ....... 4029405

[51] Int. Cl.$^5$ .......................... B32B 1/04; B32B 3/02
[52] U.S. Cl. ....................................... 428/74; 428/68; 428/69; 428/76; 428/476.1
[58] Field of Search .................. 428/68, 69, 76, 74

[56] References Cited

U.S. PATENT DOCUMENTS 4,284,674  8/1981  Sheptak ................................ 428/69
4,636,415  1/1987  Barito et al. ........................... 428/68
4,636,416  1/1987  Kratel et al. ........................... 428/69

FOREIGN PATENT DOCUMENTS 3915170  11/1990  Fed. Rep. of Germany .

Primary Examiner—George F. Lesmes
Assistant Examiner—Chris Raimund
Attorney, Agent, or Firm—Cushman, Darby & Cushman

[57] ABSTRACT

A heat-insulator consisting of
a) A finely distributed, powdery or fibrous substance
b) A microporous casing and
c) A gas- and watertight, metal-free casing.

The heat insulator is manufactured by optionally the powdery or fibrous substance, optionally bringing it into a microporous casing, optionally pressing it and then optionally drying it. The powdery substance is then brought with the microporous casing into a gas- and watertight, metal-free casing. This gas- and watertight casing is optionally evacuated and sealed.

6 Claims, 4 Drawing Sheets

HEAT INSULATOR AND METHOD OF MAKING SAME

The present invention relates to a preferably lamellar shaped article for use as thermal insulation and to the method of its manufacture.

BACKGROUND OF THE INVENTION

Thermal insulation plates or flat, level thermal insulation structures based on precipitated silica which are evacuated and provided with a multi-layer casing are known.

Thus, EP-A 0 190 582 (U.S. Pat. No. 4,636,415) and EP 0 254 993 (U.S. Pat. No. 4,681,788) describe a casing consisting of composite foils which additionally contain a metal foil of e.g. aluminum. These foils should be airtight and watertight.

EP-B 0 164 006 (U.S. Pat. No. 4,636,416) describes heat insulators which contain fine metal oxides and are evacuated. The casing material can be a composite foil with a layer sequence of thermoplastic material/metal foil/thermoplastic material.

Japanese published, unexamined application Sho 62-207 777 (Sept. 12, 1987) describes heat-insulating elements which are produced by filling perlite or other light, porous materials into a container of heat-sealable plastic laminate and then evacuating the interior of this container.

Known heat-sealed, heat-insulating elements consist of plastic laminate with a thickness of 25 μm, a water-vapor permeability of 1.0 g/m².d at 38° C. and 90% relative moisture as well as with an oxygen permeability of 2.0 cm³/m².d at 23° C. and 90% relative humidity. The laminates consist of vinylidene chloride- vinyl chloride copolymer which is vapor-plated on at least one side with a layer of aluminum 100 to 1000 angstroms thick. At least one laminate layer is used.

The known use of metal-coated composite foils has the disadvantage that heat can be conducted parallel to the foil surface. This results, if they are used in insulating materials, in undesirable heat transfer between the cold and the warm sides across the edges of the heat-insulation body. A consequence is an adverse effect on the total thermal conductivity of the heat-insulation body which is not detected in thermal-conductivity measurements according to the absolute single-plate method with protective ring technique according to Kohlrausch (F. Kohlrausch: "Praktische Physik", vol. 1, 22nd edition, B. G. Teubner Verlag, Stuttgart, 1968, p. 375 ff.).

A heat-insulator manufactured according to EP A 0 190 582 using a metallic foil exhibits a thermal conductivity of 8 mW/(m.K) at 23° C., measured in accordance with the above-mentioned method. If a measuring arrangement without protective ring is selected, the thermal conductivity rises as a function of the geometry and size of the insulation article and as a function of the thickness of the metal layer in the casing foil, to values which are in part considerably higher.

The insulating capacity of the entire heat insulator thus also depends to a significant degree on whether the casing foil used in the manufacture is made of metal.

German patent application DE-OS 39 15 170 teaches a shaped article for use as heat insulation which consists of a finely distributed powdery or fibrous substance with a water-absorption capacity of 4 to 50% by weight at 23° C. and 85% relative humidity and of a metal-free casing which surrounds this finely distributed powdery or fibrous substance, exhibiting a water-vapor permeability of 0.1 to 0.5 g/m².d at 23° C. and 85% relative humidity and gas permeabilities totalling 0.1 to 0.5 cm³/(m².d. bar) at 23° C.

These known articles can retain their low thermal conductivity for only approximately 3 years under the specified conditions.

If the heat-insulation bodies are to be used for the insulating of cooling devices, e.g., refrigerators, they must retain the low thermal conductivity for a considerably longer time.

There is, therefore, a problem in manufacturing heat insulators which have low thermal conductivity both transversally and also longitudinally of the composite foil and which retain this low thermal conductivity for a considerably longer time than the above-mentioned 3 years.

SUMMARY OF THE INVENTION

The present invention provides a preferably plate-shaped article for use as heat-insulation, manufactured from a) A finely distributed, powdery or fibrous substance having a water-adsorption capacity of 4 to 50% by weight at 23° C. and 85% relative humidity and b) A metal-free casing which surrounds this finely distributed powdery or fibrous substance and exhibits a water-vapor permeability of 0.02 to 0.1 g/(m².d) at 23° C. and 85% relative humidity and gas permeabilities for $N_2O_2$ and $CO_2$ of, in total, 0.05 to 0.5 cm³/(m².d. bar) at 23° C. The heat insulator has the property of absorbing water up to an amount of 2 to 15% by weight without its thermal conductivity being impaired by more than 25%.

The heat insulator of the invention can be evacuated. The internal pressure is preferably approximately 1 mbar absolute.

The bulk weight of the finely distributed substance contained in the heat-insulation article can be 150 to 250 g/l, preferably 180 to 220 g/l.

The finely distributed, powdery or fibrous substance can be pressed in a microporous casing.

The finely distributed, powdery or fibrous substance can be dried in a microporous casing.

In a preferred embodiment, the microporous casing containing the finely distributed powdery or fibrous substance in a pressed and dried state can be enclosed in the metal-free casing.

The heat insulator of the invention can be manufactured by a) Optionally drying a finely distributed powdery or fibrous substance having a water absorption capacity of 4 to 50% by weight (at 23° C. and 85% relative humidity) under conditions which are sufficient to remove surface water, b) Optionally pressing the powdery or fibrous substance, c) Bringing the optionally dried and optionally pressed powdery or fibrous substance into a metal-free casing which has an opening for evacuation and exhibits a water-vapor permeability of 0.02 to 0.1 g/(m².d) at 23° C. and 85% relative humidity) and gas permeabilities for $N_2$, $O_2$ and $CO_2$ of in total 0.05 to 0.5 cm³/(m².d. bar) at 23° C., d) Evacuating the metal-free casing and e) Closing the evacuation opening of the metal-free casing while retaining the vacuum in the interior of the casing.

In a preferred embodiment of the method of the invention, the metal-free casing can be evacuated to a pressure of approximately 1 mbar absolute.

In a preferred embodiment of the method of the invention, the finely distributed powdery or fibrous substance can be dried in a microporous casing.

In an especially preferred embodiment of the method of the invention, the finely distributed powdery or fibrous substance can be pressed in a microporous casing and optionally dried thereafter.

The drying of the finely distributed powdery or fibrous substance can take place in a preferred embodiment of the invention by means of microwaves.

A foil or a fleece consisting e.g. of polypropylene, polyester or filter paper can be used as the microporous casing, which has the basic purpose of holding the fine powdery substance together during the drying and pressing steps.

In general, a foil or a material can be used for this purpose which lets through gases (e.g. air) and moisture and retains the finely powdered substance.

In principle, any substance can be used as finely distributed powdery substance if its chemical properties do not change in the course of time and if it exhibits a water absorption capacity of 4–50% by weight at 23° C. and 85% relative humidity.

The amount of water which the heat insulator of the invention may absorb corresponds to the amount of water at which the thermal conductivity of the heat insulator is raised by not more than 25%. The water content of the heat insulator which is permissible in this sense is 2 to 15% by weight and is generally lower than the water absorption capacity of the powdery substance used to produce the heat insulator.

In a preferred embodiment, the amount of water which may be absorbed in the heat insulator is 5 to 12% by weight, especially 6 to 7% by weight.

The amount of gas which may permeate into the heat insulator of the invention corresponds to the amount of gases (such as e.g. $N_2$, $O_2$ and $CO_2$) at which the thermal conductivity is raised by not more than 25%.

The internal pressure in the heat-insulation article which is admissible in this sense is a maximum of 20 mbars at an initial pressure of 1 mbar.

A finely distributed silicon dioxide material is preferred which is produced by reacting an alkali water glass and a mineral acid for the precipitation of silicon dioxide, which is used alone or in a mixture with other silicas or powdery or fibrous substances.

Such precipitated silicas are described e.g. in "Ullman's Enzyklopädie der technischen Chemie", 4th edition, vol. 21, p. 462 ff.

For example, the following precipitated silicas are suitable for producing the heat insulators of the invention: Sipernat 22 S, Sipernat 22 LS, Sipernat 50 S, FK 500 LS, FK 500 DS, FK 320 DS, FK 310, FK 700 DS.

Precipitated silicas which were spray-dried and ground are preferred.

Such precipitated silicas are commercially available under the designation FK 500 LS, FK 500 DS or Sipernat 22 LS.

Other suitable precipitated silicas are described in U.S. Pat. No. 4,495,167 (Degussa).

The following substances or combinations of substances can also be used, possibly after adding organic or inorganic fibrous materials such as fibers of glass, ceramics or plastic for mechanically stabilizing the heat-insulation articles:

Mixtures of various precipitated silicas such as e.g. Sipernat 22 LS and FK 500 LS, Sipernat 22 LS and FK 320 DS, FK 500 LS and FK 320 DS, FK 500 LS and FK 500 DS, FK 500 LS and FK 700 DS, FK 700 DS and FK 310.

Mixtures of precipitated and pyrogenic silicas such as e.g. Sipernat 22 LS, FK 320 DS, FK 310, FK 700 DS, FK 500 DS and/or FK 500 LS with Aerosil A 200 and/or Aerosil A 300.

Mixtures of precipitated silcas and silica gels such as Sipernat 22 LS, FK 320 DS, FK 500 DS and/or FK 500 LS with silica gels (e.g. the types Syloid 72 and Syloid 244 of the Grace company, Worms).

Mixtures of precipitated silicas and mineral substances such as e.g. Sipernat 22 LS, FK 320 DS, FK 500 DS and/or FK 500 LS with perlites, kaolinite, montmorillonite, mica and/or calcium sulfate (gypsum). Mixtures of precipitated silicas and ground glasses or vitreous substances such as e.g. Sipernat 22 LS, FK 320 DS, FK 500 DS and/or FK 500 LS with ground glass and/or very fine glass wool. Mixtures of precipitated silicas and carbon blacks such as e.g. Sipernat 22 LS, FK 320 DS, FK 500 DS and/or FK 500 LS with furnace carbon blacks, flame soots and/or gas blacks.

Mixtures of precipitated silicas and synthetic or natural silicate substances such as e.g. Sipernat 22 LS, FK 320 DS, FK 500 DS and/or FK 500 LS with synthetic or natural zeolites or aluminum silicates or other silicate substances (calcium silicate, kieselguhr [diatomaceous earth], Extrusil).

Mixtures of precipitated silicas and synthetic waste materials such as e.g. Sipernat 22 LS, FK 320 DS, FK 500 DS and/or FK 500 LS with flue dusts, power plant ashes, ashes from all types of combustion systems.

Mixtures of precipitated silicas and non-metallic elements such as e.g. Sipernat 22 LS, FK 320 DS, FK 500 DS and/or FK 500 LS with sulfur and/or ground carbon.

Mixtures of precipitated silicas and fibers such as e.g. Sipernat 22 LS, FK 320 DS, FK 500 DS and/or FK 500 LS with inorganic or organic fibers (viscose staple fiber or fine plastic fibers of all kinds).

Mixtures of precipitated silicas such as e.g. Sipernat 22 LS, FK 320 DS, FK 500 DS and/or FK 500 LS and organic powdery superabsorbers such as e.g. polyacrylates.

Mixtures of precipitated silicas and pyrogenic metal oxides such as e.g. Sipernat 22 LS, FK 320 DS, FK 500 DS and/or FK 500 LS with pyrogenic aluminum oxide, iron oxide and/or titanium dioxide.

Pyrogenic silicas such as e.g. Aerosil 200, Aerosil 300, Aerosil 380, Aerosil 450, OX 50, specially pretreated Aerosils, Aerosil MOX types, Aerosil COK 84.

Mixtures of various pyrogenic silicas such as e.g. Aerosil 200 or Aerosil 300 with specially pretreated Aerosil types.

Mixtures of pyrogenic silicas and silica gels such as e.g. Aerosil 200 and/or Aerosil 300 with silica gels (e.g. the types Syloid 72 and Syloid 244 of the Grace company, Worms).

Mixtures of pyrogenic silicas and minerals such as e.g. Aerosil 200 and/or Aerosil 300 with perlites, kaolinite, montmorillonite, mica and/or calcium sulfate (gypsum).

Mixtures of pyrogenic silicas and ground glasses or vitreous substances such as e.g. Aerosil 200 and/or Aerosil 300 with ground glass and/or very fine glass wool.

Mixtures of pyrogenic silicas such as e.g. Aerosil 200 and/or Aerosil 300 and carbon blacks such as e.g. furnace carbon blacks, flame soots and/or gas blacks.

Mixtures of pyrogenic silicas and synthetic or natural silicate substances such as e.g. Aerosil 200 and/or Aerosil 300 with synthetic or natural zeolites or aluminum silicates or other silicate substances (calcium silicate, kieselguhr [diatomaceous earth], Extrusil).

Mixtures of pyrogenic silicas and synthetic waste materials such as e.g. Aerosil 200 and/or Aerosil 300 with flue dusts, power plant ash, ash from all types of combustion systems.

Mixtures of pyrogenic silicas and non-metallic elements such as e.g. Aerosil 200 and/or Aerosil 300 with sulfur and/or ground carbon.

Mixtures of pyrogenic silicas and fibers such as Aerosil 200 and/or Aerosil 300 with inorganic or organic fibers (viscose staple fiber or fine plastic fibers of all kinds).

Mixtures of pyrogenic silicas such as e.g. Aerosil 200 and/or Aerosil 300 and powdery superabsorbers such as e.g. polyacrylates.

Mixtures of pyrogenic silicas and pyrogenic metal oxides such as e.g. Aerosil 200 and/or Aerosil 300 with pyrogenic aluminum oxide, iron oxide, titanium dioxide.

Mixtures of carbon blacks and silica gels such as e.g. carbon blacks or carbon-black mixtures with silica gels (e.g. the types Syloid 72 and Syloid 244 of the Grace company, Worms).

Mixtures of carbon blacks and mineral substances such as e.g. carbon blacks or carbon-black mixtures with montmorillonite and/or calcium sulfate (gypsum).

Mixtures of carbon blacks and synthetic or natural silicate substances such as e.g. carbon blacks or carbon-black mixtures with synthetic or natural zeolites or aluminum silicates or other silicate substances (calcium silicate, kieselguhr [diatomaceous earth], Extrusil).

Mixtures of carbon blacks and powdery superabsorbers such as e.g. polyacrylates.

Mixtures of carbon blacks and pyrogenic metal oxides such as e.g. carbon blacks or carbon-black mixtures with pyrogenic aluminum oxide, iron oxide, titanium dioxide.

Zeolites (zeolitic molecular sieves) such as e.g. zeolite A, zeolite X, zeolite Y, pretreated zeolites.

Mixtures of various zeolites such as e.g. zeolite X with zeolite Y.

Mixtures of zeolites and silica gels such as e.g. zeolites or zeolite mixtures with silica gels (e.g. the types Syloid 72 and Syloid 244 of the Grace Company, Worms).

Mixtures of zeolites and mineral substances such as e.g. zeolites or zeolite mixtures with perlites, kaolinite, montmorillonite, mica and/or calcium sulfate (gypsum).

Mixtures of zeolites and ground glasses or vitreous substances such as zeolites or zeolite mixtures with ground glass and/or very fine glass wool.

Mixtures of zeolites and synthetic or natural silicate substances such as e.g. zeolites or zeolite mixtures with synthetic aluminum silicates or other silicate substances (calcium silicate, kieselguhr [diatomaceous earth], Extrusil).

Mixtures of zeolites and synthetic waste materials such as e.g. zeolites or zeolite mixtures with flue dusts, power plant ash, ash from all types of combustion systems.

Mixtures of zeolites and non-metallic elements such as e.g. zeolites or zeolite mixtures with sulfur and/or ground carbon.

Mixtures of zeolites and fibers such as e.g. zeolites or zeolite mixtures with inorganic or organic fibers (viscose staple fiber or fine plastic fibers of all kinds).

Mixtures of zeolites and powdery superabsorbers such as e.g. polyacrylates.

Mixtures of zeolites and pyrogenic metal oxides such as e.g. zeolites or zeolite mixtures with pyrogenic aluminum oxide, iron oxide, titanium dioxide.

Silica gels such as e.g. Syloid 72 (Grace Company, Worms), Syloid 244 (Grace Company, Worms). Mixtures of various silica gels such as e.g. Syloid 72 with Syloid 244 (Grace Company, Worms), differently pretreated silica gels.

Mixtures of silica gels and mineral substances such as e.g. silica gels or silica-gel mixtures with perlites, kaolinite, montmorillonite, mica and/or calcium sulfate (gypsum).

Mixtures of silica gels and ground glasses or vitreous substances such as e.g. silica gels or silica-gel mixtures with ground glass and/or very fine glass wool.

Mixtures of silica gels and synthetic or natural silicate substances such as e.g. silica gels or silica-gel mixtures with synthetic aluminum silicates or other silicate substances (calcium silicate, kieselguhr [diatomaceous earth], Extrusil).

Mixtures of silica gels and synthetic waste materials such as e.g. silica gels or silica-gel mixtures with flue dusts, power plant ashes, ashes from all types of combustion systems.

Mixtures of silica gels and non-metallic elements such as e.g. silica gels or silica-gel mixtures with sulfur and/or ground carbon.

Mixtures of silica gels and fibers such as e.g. silica gels or silica-gel mixtures with inorganic or organic fibers (viscose staple fiber or fine plastic fibers of all kinds).

Mixtures of silica gels and powdery superabsorbers such as e.g. polyacrylates.

Mixtures of silica gels and pyrogenic metal oxides such as e.g. silica gels or silica-gel mixtures with pyrogenic aluminum oxide, iron oxide, titanium dioxide.

Mixtures of various aluminum silicates such as e.g. different types of aluminum silicate, differently pretreated aluminum silicates.

Mixtures of aluminum silicates and mineral substances such as e.g. aluminum silicates or aluminum silicate mixtures with perlites, kaolinite, montmorillonite, mica and/or calcium sulfate (gypsum).

Mixtures of aluminum silicates and ground glasses or vitreous substances such as e.g. aluminum silicates or aluminum silicate mixtures with ground glass and/or very fine glass wool.

Mixtures of aluminum silicates and synthetic or natural silicate substances such as e.g. aluminum silicates or aluminum silicate mixtures with other silicate substances (calcium silicate, kieselguhr [diatomaceous earth], Extrusil).

Mixtures of aluminum silicates and synthetic waste materials such as e.g. aluminum silicates or aluminum silicate mixtures with flue dusts, power plant ashes, ashes from all types of combustion systems.

Mixtures of aluminum silicates and non-metallic elements such as e.g. aluminum silicates or aluminum silicate mixtures with sulfur and/or ground carbon.

Mixtures of aluminum silicates and fibers such as e.g. aluminum silicates or aluminum silicate mixtures with inorganic or organic fibers (viscose staple fiber or fine plastic fibers of all kinds).

Mixtures of aluminum silicates and powdery superabsorbers such as e.g. polyacrylates.

Mixtures of aluminum silicates and pyrogenic metal oxides such as e.g. aluminum silicates or aluminum silicate mixtures with pyrogenic aluminum oxide, iron oxide, titanium dioxide.

Metal oxides (pyrogenic or precipitated) such as e.g. aluminum oxide, iron oxides, titanium dioxide, zirconium dioxide.

Mixtures of various metal oxides (pyrogenic or precipitated) such as e.g. aluminum oxide with various iron oxides, aluminum oxide with titanium dioxide, titanium dioxide with various iron oxides.

Mixtures of metal oxides (pyrogenic or precipitated) and mineral substances such as e.g. aluminum oxide, various iron oxides, titanium dioxide and/or zirconium dioxide with perlites, kaolinite, montmorillonite, mica and/or calcium sulfate (gypsum).

Mixtures of metal oxides (pyrogenic or precipitated) and ground glasses or vitreous substances such as e.g. aluminum oxide, various iron oxides, titanium dioxide and/or zirconium dioxide with ground glass and/or very fine glass wool.

Mixtures of metal oxides (pyrogenic or precipitated) and synthetic or natural silicate substances such as e.g. aluminum oxide, various iron oxides, titanium dioxide and/or zirconium dioxide with silicate substances (calcium silicate, kieselguhr [diatomaceous earth], Extrusil).

Mixtures of metal oxides (pyrogenic or precipitated) and synthetic waste materials such as e.g. aluminum oxide, various iron oxides, titanium dioxide and/or zirconium dioxide with flue dusts, power plant ashes, ashes from all types of combustion systems.

Mixtures of metal oxides (pyrogenic or precipitated) and non-metallic elements such as e.g. aluminum oxide, various iron oxides, titanium dioxide and/or zirconium dioxide with sulfur and/or ground carbon.

Mixtures of metal oxides (pyrogenic or precipitated) and fibers such as e.g. aluminum oxide, various iron oxides, titanium dioxide and/or zirconium dioxide with inorganic or organic fibers (viscose staple fiber or fine plastic fibers of all kinds).

Mixtures of metal oxides (pyrogenic or precipitated) such as e.g. aluminum oxide, various iron oxides, titanium dioxide and/or zirconium dioxide and superabsorbers such as e.g. polyacrylates.

The following can also be used as precipitated silcas:
HISIL T 600, HISIL T 690 of the PPG company
Tixosil 333 of the Rhone-Poulenc company
Hoesch SM 614 of the AKZO company
Zeothix 265 and Zeothix 177 of the Huber company The casings which can be used in accordance with the invention can have a water-vapor permeability of 0.02 to 0.1 g/($m^2$ d) at 23° C. and 85% relative humidity. The permeabilities for other gases (e.g. $N_2$, $O_2$ and $CO_2$) must not exceed 0 05 to 0.5 $cm^3$/($m^2$.d. bar) at 23° C. in their sum. The gas permeabilities are to be dimensioned in such a manner that the internal pressure in the heat-insulation article does not exceed 20 mbars at the end of the service life.

Since the gas permeability is lower than the water-vapor permeability by a factor of approximately 1000, the maximum service life of the heat-insulation article is achieved if the filling material is incapable of further absorption of water vapor or if the thermal conductivity rises sharply upon a further absorption of water vapor.

Foils have proved to be especially effective which are designed in multi-layers in such a manner that a gas barrier on the upper side and on the lower side is provided with a highly effective water-vapor barrier via an adhesive layer.

Such a casing can be a multilayer foil which is free of metallic layers, comprises a barrier layer and, in essence, the following layers:

A) A layer of protective lacquer or, optionally, a layer of polyvinyl alcohol provided with a protective lacquer,
B) An optional connecting or adhesive layer,
C1) A layer of polyolefin,
B2) An optional connecting or adhesive layer,
D) A layer of ethylene vinyl alcohol or a layer of ethylene vinyl alcohol provided on at least one side with a layer of polyamide,
B3) An optional connecting or adhesive layer,
C2) A layer of polyolefin.

The protective lacquer A can consist of polyvinylidene chloride (PVDC). The layer A) of polyvinyl alcohol preferably consists of an ethylene/vinyl acetate copolymerizate which consists of 40 to 85, especially 60 to 75 mole % vinyl acetate units which are saponified to at least 90%, preferably to more than 95 mole %. A quite especially preferred layer of polyvinyl alcohol consists of more than 95 mole % saponified polyvinyl acetate units. The foil produced therefrom is biaxially stretched.

In a preferred embodiment, the layer A) of polyvinyl alcohol is surrounded, especially lacquered on one or both sides with polyvinylidene chloride (PVDC).

The layer A) of polyvinyl alcohol lacquered with PVDC is connected in a preferred embodiment to the following layers via a connecting or adhesive layer B1). A commercially available two-component polyurethane adhesive is preferred for the adhesive layer.

However, layer B1) can also be a connecting layer consisting of a polyolefin.

Olefin layer C1) consists essentially of an olefin polymer. Especially preferred polyolefins are:
Polyethylene homopolymers and polyethylene copolymers;
EBA (=ethylene butylacrylate);
EAA (=ethylene acrylic acid);
EEA (=ethylene ethyl acetate); and
Ionic resins, especially from an ethylene-methacrylic acid copolymer (=EMA) whose chain molecules are cross-linked via ionic linkage, especially via zinc ions.

Layer B2) consists essentially of the components indicated under B1).

A layer of ethylene vinyl alcohol with a vinyl alcohol content of preferably 40 mole % to 90 mole % relative to the ethylene vinyl alcohol copolymer is taken in particular as gas barrier layer D).

In an especially preferred embodiment, the layer D) of ethylene vinyl alcohol has a vinyl alcohol content between 65 and 75 mole % relative to the ethylene vinyl alcohol copolymer and is surrounded on one or in particular on both sides by a polyamide layer E), e.g. a polyamide 6. In an especially preferred embodiment, a coextruded composite consisting of layers E1), D), E2) is brought into the foil used in accordance with the invention.

Insofar as a combining or adhesive layer B3) is included it can comprise one of the components under B1).

The polyolefin layer C2) consists essentially of one of the components indicated under layer C1). An LLDPE (=linear low-density polyethylene) is used with preference as the polyethylene. The individual layers preferably exhibit the following thicknesses in μm:
Layer A) PVDC: 12 μm or polyvinyl alcohol optionally PVDC lacquered: 10 to 20 μm,
B1: 0.1 to 10 μm insofar as an adhesive is used.
C1): 5 to 500 μm,
B2) 0.2 to 10 μm insofar as an adhesive is used or 5 to 500 μm insofar as a polyolefin is used as binder,
Layer D): 1 to 50 μm,
Layers E): 5 to 100 μm each,
Layer B3): 0.2 to 10 μm in as far as an adhesive is used,
Layer C2): 5 to 500 μm.

In a preferred embodiment at least one layer of the composite foil is stretched; it is particularly preferred that layer A) is biaxially stretched insofar as not only the protective lacquer alone is involved.

The composite foil can be provided in the individual layers with conventional additives and auxiliary agents such as e.g. lubricants, anti-blocking agents and anti-static agents in normal amounts. Preferred additives are saturated or unsaturated fatty-acid amides.

The composite foil which can be used in accordance with the invention preferably exhibits a total thickness of 100 to 1500 μm, especially 150 to 500 μm. A quite particularly preferred composite foil which can be used in accordance with the invention is distinguished by the following properties:
Permeability against water vapor (determined according to DIN 53 122): <0.1 g/m$_2$. day
Permeability against oxygen (according to DIN 53 380): <0.1 cm$^3$/m$^2$ d.bar.

The barrier effect of the foil against water vapor and gas is unexpectedly high—a vacuum in a bag consisting of the foil which can be used in accordance with the invention is retained for an unexpectedly long time.

DETAILED DESCRIPTION OF PREFERRED EMBODIMENTS

Figure 1:
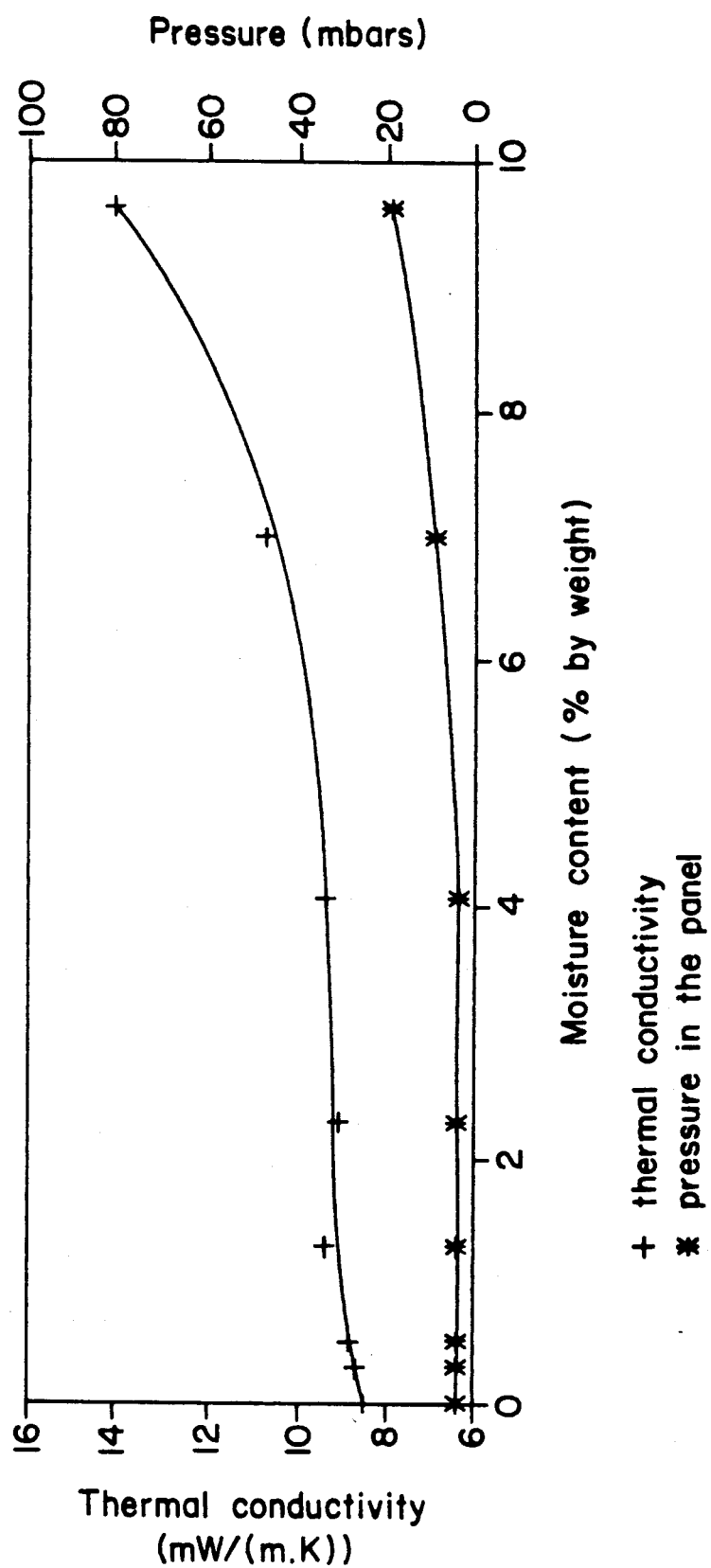

The invention is illustrated by the following examples.

EXAMPLE 1

A foil which can be used in accordance with the invention was produced with a structure containing the following layers:
A: Polyvinyl alcohol layer lacquered on both sides with PVDC, thickness 15 μm
B1: Adhesive layer consisting of a two-component polyurethane adhesive, thickness 2 μm
C1: Polyolefin layer consisting of polyethylene, thickness 50 μm
B2: Connecting layer consisting of two-component polyurethane adhesive, thickness 2 μm
D: Ethylene vinyl alcohol layer D reinforced on both sides with polyamide (thickness of the polyamide layers 37.5 μm each, thickness of the ethylene vinyl alcohol layer 5 μm)
B3: Polyurethane adhesive layer, thickness 2 μm
C2: Polyolefin layer consisting of linear low- density polyethylene, thickness 100 μm The individual layer components are indicated in more detail in the following:

A: The polyvinyl alcohol layer is biaxially stretched.
B1, B2, B3: Commercially available two-component laminating adhesive.
C1,C2:
Blown films—polyethylene consisting of LLDPE
Density: 0.921
Melting index: 0.8 g/10 min.
D,E: Coextruded composite foil consisting of polyamide 6 and ethylene vinyl alcohol copolymer.

EXAMPLE 2

A foil which can be used in accordance with the invention was produced with the layer construction indicated in the following:
A Polyvinyl alcohol layer lacquered on both sides with PVDC, thickness 15 μm
B1: Adhesive layer consisting of a two-component polyurethane adhesive, thickness 2 μm
C1: Polyolefin layer consisting of polyethylene, thickness 75 μm
B2: Connecting layer of low-density polyethylene, thickness 50 μm
D: Ethylene vinyl alcohol layer D reinforced on both sides with polyamide (thickness of the polyamide layers 37.5 μm each, thickness of the ethylene vinyl alcohol layer 5 μm)
B3: Polyurethane adhesive layer, thickness 2 μm
C2: Polyolefin layer consisting of linear low- density polyethylene, thickness 100 μm The individual layer components correspond to those of Example 1; however, layer B2 consists of a low-density polyethylene for extrusion lamination.

The foil was manufactured in a known manner by means of adhesive lining and coextrusion.

After a storage (temperature 23° C., 50% relative humidity), the foil was subjected to the following tests and exhibited the indicated results:
1) Test of permeability for the gases:
    oxygen
    nitrogen
    carbon dioxide
        Test atmosphere: 23° C., 0% relative humidity.
        Results: The permeability is <0.1 cm$^3$/m$^2$.day.bar for all gases tested and is below detectable limits by conventional measuring methods.
2) Testing of the water vapor permeability:
    Test atmosphere: 23° C., 85% relative humidity
    Result: Permeability <0.1 g/m$^2$.d.

The metal-free casing which can be used in accordance with the invention can preferably be a multilayer foil which can be constructed in the following manner (Example 3):

| | |
|---|---|
| LLDPE | Linear low-density polyethylene (sealing layer) |
| HV | Bonding agent (adhesive layer) |
| EVOH | Ethylene vinyl alcohol copolymerizate (adhesive layer) |
| HV | Bonding agent (adhesive layer) |
| LLDPE | Linear low-density polyethylene |
| PVDC | Polyvinylidene chloride |
| The following layer construction is especially suitable: | |
| LDPE | Linear low-density polyethylene thickness 65 μm specific weight 0.92 g/cm$^3$ |
| HV | Bonding agent, thickness 5 μm, specific weight 0.92 g/cm$^3$ |
| EVOH | Ethylene vinyl alcohol copolymerizate thickness 10 μm, specific weight 1.17 g/cm$^3$ |
| HV | Bonding agent, thickness 5 μm, specific weight 0.92 g/cm$^3$ |

-continued

| | |
|---|---|
| LLDPE | Linear low-density polyethylene thickness 65 μm, specific weight 0.92 g/cm³ |
| PVDC | Polyvinylidene chloride, thickness 12 μm, specific weight 1.35 g/cm³ |

Another especially preferred multilayer foil has the following composition (Example 4):

| | |
|---|---|
| LLDPE | Linear low-density polyethylene (sealing layer) |
| HV | Bonding agent (adhesive layer) |
| PA/EVOH/PA | Ethylene vinyl alcohol copolymerizate reinforced on both sides with polyamide |
| HV or PE | Bonding agent (adhesive layer) or connecting layer of low-density polyethylene (for lining) |
| LLDPE | Linear low-density polyethylene |
| HV | Bonding agent (adhesive layer) |
| PVDC/PVOH/PVDC | Polyvinyl alcohol lacquered on both sides with polyvinylidene chloride |

The following layer construction has proven to be especially suitable:

| | |
|---|---|
| LLDPE | Linear low-density polyethylene, thickness 100 μm, specific weight 0.921 g/cm³, melting index 0.89/10 min. |
| HV | Adhesive layer of two-component polyurethane lining adhesive thickness 2 μm |
| PA/EVOH/PA | Coextruded composite foil of two polyamide 6 layers (thicknesses 37.5 μm each and ethylene vinyl alcohol copolymerizate (thickness 5 μm) therebetween |
| HV or PE | Adhesive layer of two-component polyurethane lining adhesive, thickness 2 μm or: Connecting layer of low-density polyethylene, thickness 50 μm |
| LLDPE | Linear low-density polyethylene, thickness 50 μm or 75 μm, specific weight 0.921 g/cm³, melting index 0.8 g/10 min. |
| HV | Adhesive layer of two-component polyurethane lining adhesive, thickness 2 μm |
| PVDC/FVOH/PVDC | Biaxially stretched polyvinyl alcohol lacquered on both sides with polyvinylidene chloride, thickness 15 μm |

Finely divided powdery or fibrous substances with a water absorption capacity of 4 to 50% by weight (at 23° C. and 85% relative humidity) are suitable for the heat insulators of the invention. The amount of water which the finely distributed substances may absorb when used in the heat insulator of the invention is as a rule less than their water absorption capacity The limit value for the permissible water absorption in the heat-insulation body corresponds to the amount of water at which the thermal conductivity of the heat insulator has increased by not more than 25% in relation to a dry heat insulator. In order to manufacture a dry heat insulator, a finely distributed substance is used which was dried in accordance with DIN 55 921. The appropriate amount of water which a heat-insulation body may absorb is preferably between 2 and 15% by weight relative to the dry filling material.

The heat-insulators of the invention have the advantage over heat-insulators in accordance with the state of the art that the thermal conductivity in the edge area of the heat-insulators is so low on account of the use of metal-free casing foils that the very good total thermal conductivity of the heat insulators of approximately 8 mW/(m.K.) (measured according to the absolute one-plate method with protective ring on heat-insulation substances manufactured from the precipitated silica FK 500 LS) is impaired only to an insignificant degree.

Thus, containers, for example, can be manufactured from the heat insulators of the invention which are suitable for the storage and/or the transport of temperature-sensitive goods (examples for this are one-way transport containers for temperature-sensitive medicines or vaccines as well as refrigerators and freezers The following table lists examples for the thermal conductivities of heat insulators manufactured with metal-free casing foil. The thermal conductivities were measured in each instance according to the absolute one-plate method with protective ring and according to a method without protective ring technique. In the method without protective ring technology, thermal currents flowing through the casing foil from one side of a plate-shaped heat-insulation body to the other side are not compensated and a value is obtained for the total thermal conductivity of the heat insulator (as a function of the geometry and the size of the heat insulator).

Filling material: FK 500 LS
Dimensions: 250 mm × 250 mm × 20 mm

Thermal conductivities of various heat-insulation bodies as a function of the measuring method

| | Measurement method for determining the thermal conductivity | |
|---|---|---|
| Type of heat-insulation body | According to the absolute one-plate method with protective ring according to Kohlrausch (cold side −20° C.; warm side +20° C.) | According to the one-plate method |
| Heat-insulating body Without protective with metallic ring casing (lined Al foil with a thickness of 12 μm) according to the state of the art | 8 mW/m/K | approximately 25 mW/m/K |
| Heat insulation body with metal-free casing according to the invention | 8 mW/m/K | approximately 9 mW/m/K |

The powdery or fibrous substances used in accordance with the invention are characterized e.g. by the following physico-chemical characteristic data in accordance with Tables 1, 2, 3 and 4:

TABLE I

| | | AEROSIL 200 | AEROSIL 300 | AEROSIL 380 | AEROSIL OX 50 | AEROSIL COK 84 |
|---|---|---|---|---|---|---|
| Surface according to BET | m²/g | 200 ± 25 | 300 ± 30 | 300 ± 30 | 50 ± 15 | 170 ± 30 |
| Average size of the primary particles Nanometers | | 12 | 7 | 7 | 40 | — |
| Stamping density 1) | g/l | ca. 50 | ca. 50 | ca. 50 | ca. 130 | ca. 50 |
| Drying loss 2) (2 h at 105° C.) upon leaving the factory % | | <1,5 | <1,5 | <1,5 | <1,5 | <1,5 |
| Annealing loss 2) 7) (2 h at 1000° C.) | | <1 | <2 | <2,5 | <1 | <1 |

TABLE 1-continued

|  |  | AEROSIL 200 | AEROSIL 300 | AEROSIL 380 | AEROSIL OX 50 | AEROSIL COK 84 |
|---|---|---|---|---|---|---|
| pH 3) (in 4% aqueous dispersion) |  | 3,6–4,3 | 3,6–4,3 | 3,6–4,3 | 3,8–4,5 | 3,6–4,3 |
| $SiO_2$ 5) | % | >99,8 | >99,8 | >99,8 | >99,8 | 82–86 |
| $Al_2O_5$ 5) | % | <0,05 | <0,05 | <0,05 | <0,08 | 14–18 |
| $Fe_2O_3$ 5) | % | <0,003 | <0,003 | <0,003 | <0,01 | <0,1 |
| $TiO_2$ 5) | % | <0,03 | <0,03 | <0,03 | <0,03 | <0,03 |
| HCl 5) 10) | % | <0,025 | <0,025 | <0,025 | <0,01 | <0,1 |
| Sieve residue 4) according to Mocker (45 μm) |  |  |  |  |  |  |

1) according to DIN 52 194
2) according to DIN 55 921
3) according to DIN 53 200
4) according to DIN 580
5) relative to the substance annealed 2 hours at 1000° C.
7) relative to the substance dried 2 hours at 105° C.
10) HCl content is a component of the annealing loss

TABLE 2

|  |  | EXTRUSIL |
|---|---|---|
| Surface according to BET 1) | m²/g | 35 |
| Average size of the agglomerates | μm | 5 8) |
| Stamping density 2) | g/l | 300 |
| Drying loss 2) (2 h at 105° C.) upon leaving the supplier 3) | % | 6 |
| Annealing loss (2 h at 1000° C.) 4) 10) | % | 7 |
| pH (in 5% aqueous dispersion) 5) |  | 10 |
| DBP absorption 6) 10) | g/100 g | 160 |
| $SiO_2$ 11) | % | 91 |
| $Al_2O_3$ 11) | % | 0.2 |
| CaO 11) | % | 6 |
| $Na_2O$ 11) | % | 2 |
| $Fe_2O_3$ 11) | % | 0.03 |
| $SO_3$ 11) | % | — |
| $Cl^-$ 11) | % | 0.8 |
| Sieve residue (according to Mocker, 45 μm) 7) | % | 0.2 |

1) according to DIN 66 131
2) according to DIN ISO 787/XI, JIS K 5101/78 (non-sieved)
3) according to DIN ISO 787/II, ASTM D 280, JIS K 5101/21
4) according to DIN 55 921, ASTM D 1208, JIS K 5101/23
5) according to DIN ISO 787/IX, ASTM D 1208, JIS K 5101/24
6) according to DIN 53 601, ASTM D 2414
7) according to DIN ISO 787/XVIII, JIS K 5101/20
8) Coulter counter, 100 μm capillary
10) relative to the substance dried 2 hours at 105° C.
11) relative to the substance annealed 2 hours at 1000° C.

TABLE 3

|  |  | FK 320 DS | FK 500 LS | SUPER-NAT 22 LS |
|---|---|---|---|---|
| Surface according to BET 1) | m²/g | 170 | 450 | 190 |
| Average size of the agglomerates | μm | 4 9) | 3.5 9) | 4.5 9) |
| Stamping density 2) % |  | 80 | 80 | 80 |
| Drying loss (2 h at 105° C.) upon leaving the supplier % 3) |  | 6 | 3 | 6 |
| Annealing loss (2 h at 1000° C.) 4) 10) % |  | 5 | 5 | 5 |
| pH (in 5% aqueous dispersion) 5) |  | 6.3 | 6.5 | 6.3 |
| DBP absorption 6) 10) g/100 g |  | 230 | 330 | 270 |
| $SiO_2$ 11) % |  | 98 | 98.5 | 98 |
| $Na_2O$ 11) % |  | 1 | 0.6 | 1 |
| $Fe_2O_3$ 11) % |  | 0.03 | 0.03 | 0.03 |
| $SO_3$ 11) % |  | 0.8 | 0.7 | 0.8 |
| Sieve residue (according to Mocker, 45 μm) 7) % |  | 0.01 | 0.02 | 0.1 |

1) according to DIN 66 131
2) according to DIN ISO 787/XI, JIS K 5101/78 (non-sieved)
3) according to DIN ISO 787/II, ASTM D 280, JIS K 5101/21
4) according to DIN 55 921, ASTM D 1208, JIS K 5101/23
5) according to DIN ISO 787/IX, ASTM D 1208, JIS K 5101/24
6) according to DIN 53 601, ASTM D 2414
7) according to DIN ISO 787/XVIII, JIS K 5101/20
8) Coulter counter, 100 μm capillary
10) relative to the substance dried 2 hours at 105° C.
11) relative to the substance annealed 2 hours at 1000° C.

TABLE 4

| Manufacturer Type |  | Hoesch SM 614 | Huber Zeothix 265 | Huber Zeothix 177 | PPG HiSil T 600 | PPG HiSil T 690 | Rhene-Poulene Tixosil 333 | Grace Syloid 72 | Grace Syloid 244 |
|---|---|---|---|---|---|---|---|---|---|
| $SiO_2$ content 1) | (%) | 87 | — | — | — | — | 97 | 99 | 99.5 |
| Dry loss 2) | (%) | 6 | 7 | — | 1–2 | 10 | — | 1 | 4 |
| Annealing loss 2) | (%) | 9 | — | — | — | — | ±11 | 5 | 7 |
| pH 3) |  | 6 | 7 | 7 | 3.5 | 7 | 6.8 | 6 | 6 |
| BET surface | (m²/g) | — | 260 | 175 | 200 | 150 | 300 | — | — |
| Average particle size 4) | (μm) | 8 | 1.7 | 1.5 | 0.015 | 0.021 | 2.3 | 4 | 2 |
| Oil absorption | (m¹/100 g) | — | 220 | 235 | — | — | 370 | — | — |
| Wet sieve residue | (%) | — | — | — | — | — | — | 0.02 | 0.02 |
| Pore volume | (ml/g) | — | — | — | — | — | — | 1.2 | 1.6 |
| Type |  | FK 6) | FK 6) | FK 6) | FK 6) | FK 6) | FK 6) | KG 7) | KG |

1) relative to substance annealed at 1000° C.
2) DIN 55 921
3) DIN 53 200
4) Coulter counter 100 μm capillary
5) according to Mocker
6) precipitation silicic acid
7) silica gel Examples are given in the following to show the influence of water content of a heat-insulation body on its thermal conductivity The measurements take place according to the absolute one-plate meth with protective ring technique according to Kohlrausch (cold side: 20° C.; warm side +20° C.).

1. FK 500 LS
Influence of the moisture content on the thermal conductivity
Density after compression: 200 g/l
Moisture content adjusted with microwave

| Moisture content* (%) | Thermal conductivity (mW/m/K) | Internal pressure** (mbars) |
|---|---|---|
| 0.3 | 8.8 | <4 |
| 0.5 | 8.9 | <4 |
| 1.3 | 9.4 | <4 |
| 2.3 | 9.1 | <4 |
| 4.1 | 9.4 | <4 |
| 7.0 | 11.0 | ca. 10 |
| 9.6 | 14.0 | ca. 20 |

*Moisture content in % by weight relative to the dry substance
**Internal pressure (pressure in the heat-insulation body) measured in each instance after the measurement of thermal conductivity
These results are graphically shown in FIG. 1.

2. FK 500 LS
Influence of the moisture content on the thermal conductivity
Density after compression: 200 g/l
Adjustment of the moisture content by drying in a forced-air drying oven (105–110° C.)

| Moisture content* (%) | Thermal conductivity (mW/m/K) | Internal pressure** (mbars) |
|---|---|---|
| 0 | 9.5 | <4 |
| 0.2 | 10.0 | <4 |
| 0.5 | 10.5 | <4 |
| 0.8 | 9.7 | <4 |
| 1.0 | 10.0 | <4 |
| 1.1 | 10.3 | <4 |
| 2.1 | 9.7 | <4 |
| 3.6 | 10.7 | <4 |
| 4.0 | 9.8 | <4 |
| 5.1 | 10.6 | <4 |
| 7.0 | 11.0 | ca. 10 |
| 9.6 | 14.0 | ca. 20 |

Figure 2:
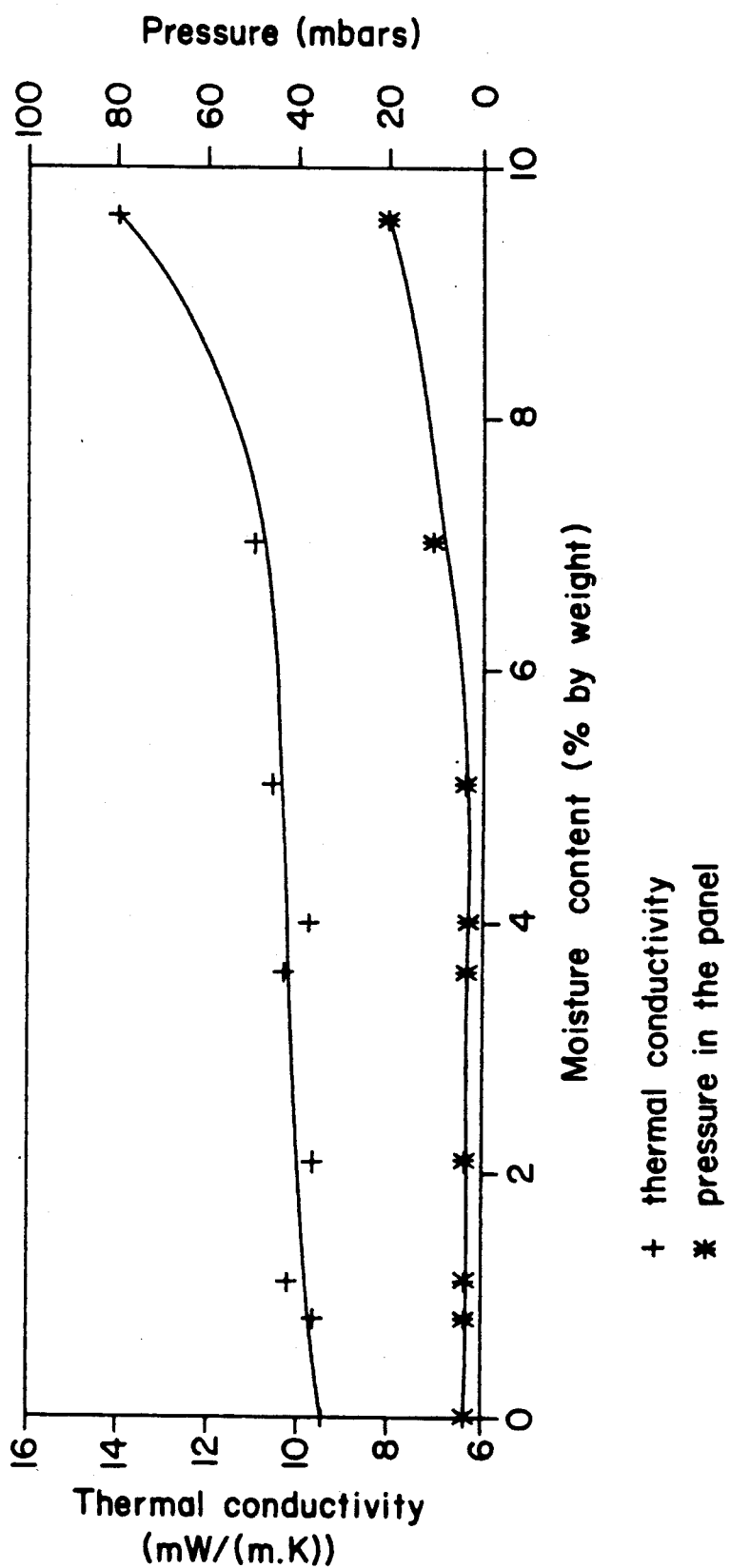

*Moisture content in % by weight relative to the dry substance
**Internal pressure (pressure in the heat-insulation body) measured in each instance after the measurement of thermal conductivity
These results are graphically shown in FIG. 2.

3. FK 320 DS
Influence of the moisture content on the thermal conductivity
Density after compression: 210 g/l
Adjustment of the moisture content by drying in a forced-air [recirculating-air] drying oven (105–110° C.)

| Moisture content* (%) | Thermal conductivity (mW/m/K) | Internal pressure** (mbars) |
|---|---|---|
| 0 | 8.6 | <4 |
| 0.6 | 9.1 | <4 |
| 1.5 | 9.2 | <4 |
| 2.5 | 9.5 | <4 |
| 3.4 | 9.3 | <4 |
| 4.5 | 9.7 | ca. 8 |
| 5.5 | 9.7 | ca. 10 |
| 7.4 | 10.8 | ca. 15 |

Figure 3:
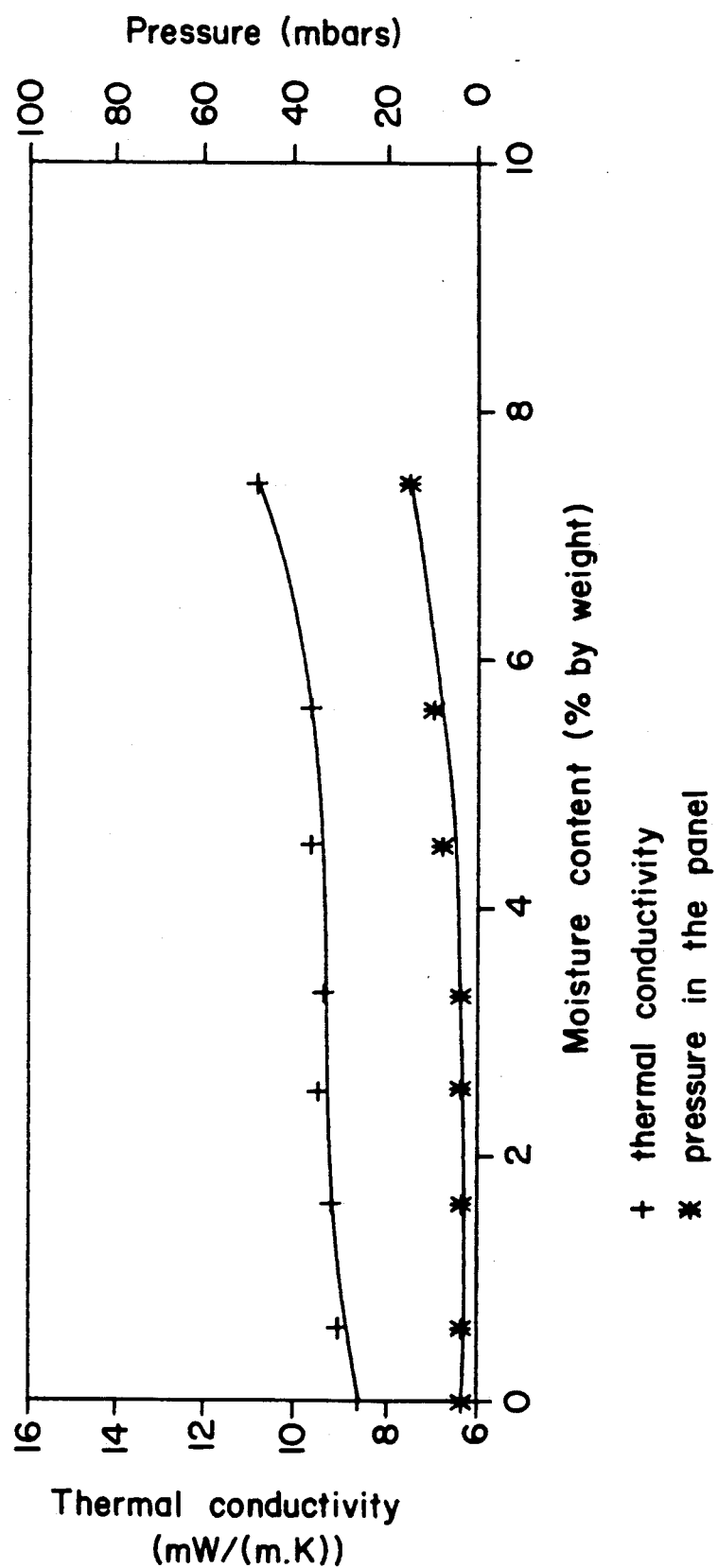

*Moisture content in % by weight relative to the dry substance
**internal pressure (pressure in the heat-insulation body) measured in each instance after the measurement of thermal conductivity These results are graphically shown in FIG. 3.

Since the internal pressure in the heat-insulation article gradually rises as a consequence of gases diffusing in (the sum of the gas permeabilities of the casing foil is in a range between 0.05 to 0.5 cm³/m².d.bar), examples will be given to show the influence of the pressure in the heat insulator on the thermal conductivity of the insulation body.

1. FK 500 LS
Influence of the pressure on the thermal conductivity
Density after compression: 200 g/l

| Internal pressure (mbars) | Thermal conductivity (mW/(m.K) |
|---|---|
| 2 | 8.1 |
| 5 | 8.2 |
| 10 | 9.2 |
| 20 | 10.1 |
| 50 | 12.9 |
| 100 | 16.1 |
| 200 | 20.0 |
| 450 | 25.8 |
| 1000 | 30.8 |

Figure 4:
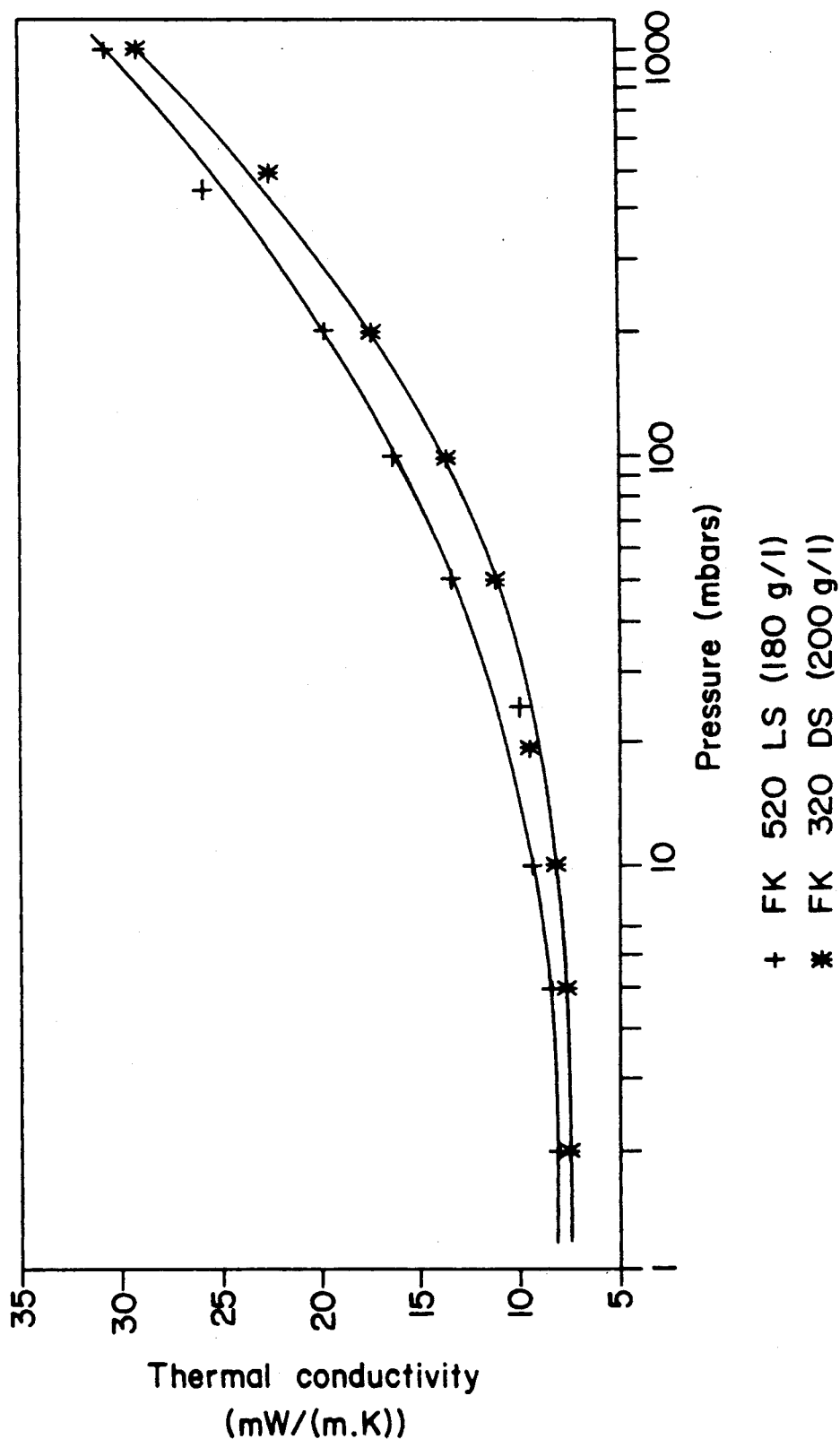

The results are shown graphically in FIG. 4.

2. FK 320 DS
Influence of the pressure on the thermal conductivity
Density after compression: 210 g/l

| Internal pressure (mbars) | Thermal conductivity (mW/(m.K) |
|---|---|
| 2 | 7.8 |
| 5 | 7.9 |
| 20 | 9.3 |
| 50 | 11.1 |
| 100 | 13.8 |
| 200 | 17.6 |
| 500 | 22.5 |
| 1000 | 29.5 |

The results are shown graphically in FIG. 4.

Examples for the Calculation of the Service Life of Heat-Insulation Bodies

The limiting value for the absorption of water can be determined from the graphic presentation of the dependency of the thermal conductivity on the moisture content of the particular filling material.

Heat insulators containing silica as filling material and having a moisture content corresponding to the limiting value still exhibit good insulating properties. At a higher moisture content both the thermal conductivity and the internal pressure (pressure in the heat-insulation body) increase. The consequence is a gradual deterioration of the insulating properties.

The moisture contents for the silicas FK 500 LS and FK 320 DS can be determined from FIGS. 1, 2 and 3 which contents are permissible when the thermal conductivities of the heat-insulation materials are permitted to deteriorate by a maximum of 25% as a consequence of the absorption of water. Silicas dried in accordance with DIN 55 921 were taken as a starting point.

Results:

| FK 500 LS | limiting value at 7% moisture content |
|---|---|
| FK 320 DS | limiting value at 6% moisture content |

In the case of known weighed silica and dimensions of the heat-insulation body, these limiting values (maximum permissible amount of water) are calculated according to the equation:

$$\text{maximum amount of water (g)} = \frac{\text{limit value (\%)}}{100(\%)} \times \text{silica mass}$$

1. FK 500 LS limit value: 7% moisture content
   a) Density after compression: 180 g/l (dimensions 100 cm × 50 cm × 2 cm)
      Volume: 10 l
      Silica mass: 1800 g
      Maximum amount of water: 126 g
   b) Density after compression: 200 g/l (dimensions 100 cm × 50 cm × 2 cm)
      Volume: 10 l
      Silica mass: 2000 g
      Maximum amount of water: 140 g
2. FK 320 DS limit value: 6% moisture content
   a) Density after compression: 200 g/l (dimensions 100 cm × 50 cm × 2 cm)
      Volume: 10 l
      Silica mass: 2000 g
      Maximum amount of water: 120 g
   b) Density after compression: 220 g/l (dimensions 100 cm × 50 cm × 2 cm)
      Volume: 10 l
      Silica mass: 2200 g
      Maximum amount of water: 132 g The service life of heat-insulation bodies can be estimated with the aid of the following equation at a known foil water vapor permeability:

$$\text{service life} \approx \frac{\text{limiting value (maximum amount of water)}}{\text{exchange surface} \ast \text{water vapor permeability}}$$

Dimensions:
Limiting value (maximum amount of water): (g)
Exchange surface: (m²)

Water vapor permeability: $\frac{g}{m^2 \cdot d}$ $$\text{service life} \approx \frac{\text{limiting value (maximum amount of water)}}{\text{exchange surface} \ast \text{water vapor permeability}}$$

Service life: (d)

The following service life is calculated by way of example for a heat-insulation body manufactured using FK 500 LS with a casing foil with the water vapor permeability of 0.05 g/m².d at 23° C. and 85% relative humidity:

| | |
|---|---|
| Filling material: | FK 500 LS |
| Density after compression: | 180 g/l |
| Dimensions: | 100 cm × 50 cm × 2 cm |
| (Moisture content): | 7% by weight (= 126 g) |
| Maximum amount of water: | 126 g |
| Exchange surface: | 1.06 m² |
| Water vapor permeability: | 0.05 g/m²/d |

$$\text{Service life} = \frac{126 \text{ g} \cdot \text{m}^2 \cdot \text{d}}{1.06 \text{ m}^2 \ast 0.05} = 2377 \text{ d} = 6.5 \text{ a}$$

at 23° C. and 85% relative humidity.

Examples are given in the following two tables to show the service-life values which can be achieved with known products and with products in accordance with the invention (with low water vapor permeabilities) for heat-insulators with the precipitated silicas FK 500 LS and FK 320 DS.

The indicated values for the service life are calculated from the water vapor permeabilities of the foils at 25° C. and 85% relative humidity The values for the service life increase considerably in part for a lower temperature and/or a lower relative air humidity The reason for this are the sharply decreasing water vapor permeabilities of the selected foil at a decrease in the temperature and in the relative air humidity.

Service life of heat-insulation bodies as a function of the water vapor permeabilities of different foils FK 500 LS: Maximum admissible moisture content 7%  Dimensions: 100 cm × 50 cm × 2 cm
FK 320 DS: Maximum admissible moisture content 6%  Exchange surface: 1.06 m²

| Foil types | water vapor* permeability (g/m²/day) | service life FK 500 LS 180 g/l | service life FK 500 LS 200 g/l | service life FK 320 DS 200 g/l |
|---|---|---|---|---|
| company Wolff-Walsrode: Combitherm XX 3/12 K 12 50 foil based on vinyl, biaxially stretched, lacquered with PVDC on both sides/polyethylene | 0.4 | 297 days | 330 days | 283 days |
| 4 P Ronsberg packagings: PVDC-coated plastics PVC/PE/PVDC PVC/PVDE/PE PVC/PVDC | 0.15 | 2.2 years | 2.4 years | 2.1 years |

*measured at 23° C. and 85% relative air moisture

Service life of heat-insulation bodies as a function of the water vapor permeabilities of different foils FK 500 LS: Maximum admissible moisture content 7%  Dimensions: 100 cm × 50 cm × 2 cm
FK 320 DS: Maximum admissible moisture content 6%  Exchange surface: 1.06 m²

| Foil types | water vapor* permeability (g/m²/day) | service life FK 500 LS 180 g/l | service life FK 500 LS 200 g/l | service life FK 320 DS 200 g/l |
|---|---|---|---|---|
| Foil according to embodiment 3 | 0.1 | 3.3 a | 3.6 a | 3.1 a |
| Foil according to | 0.05 | 6.5 a | 7.2 a | 6.2 a |

| Service life of heat-insulation bodies as a function of the water vapor permeabilities of different foils |
|---|
| embodiment 4 |

*measured at 23° C. and 85% relative air moisture

What is claimed is:

1. A heat insulator for use as heat-insulation, comprising:
   a) a finely distributed, powdery or fibrous substance with a water-adsorption capacity of 4 to 50% by weight at 23° C. and 85% relative humidity and
   b) a metal-free casing which surrounds this finely distributed powdery or fibrous substance and has a water vapor permeability of 0.02 to 0.1 g/(m².d) at 23° C. and 85% relative humidity and gas permeabilities for $N_2$, $O_2$ and $CO_2$ of in sum 0.05 to 0.5 cm³/(m².d. bar) at 23° C.,
   said heat insulator having the property of absorbing water up to an amount of 2 to 15% by weight without its thermal conductivity being impaired by more than 25%,
   said metal-free casing being a multilayer foil having improved barrier properties against gas and water vapor and which is free of metallic layers, said multi-layer foil comprising a barrier layer and, in essence, the following layers:
   A) A layer of protective lacquer or, optionally, a layer of polyvinyl alcohol provided with a protective lacquer,
   B) An optional connecting or adhesive layer,
   C) A layer of polyolefin,
   B2) An optional connecting or adhesive layer,
   D) A layer of ethylene vinyl alcohol or a layer of ethylene vinyl alcohol provided on at least one side with a layer of polyamide,
   B3) An optional connecting or adhesive layer,
   C2) A layer of polyolefin.

2. The heat insulator according to claim 1 in which layer A) is lacquered on both sides with PVDC and layer D) is reinforced on both sides with a layer of polyamide.

3. The heat insulator according to claim 1 in which the individual layers of the casing have the following thicknesses:
   Layer A: 10 to 20 μm including the layer of lacquer,
   B1:0.2 to 10 μm insofar as an adhesive is used,
   C1:5 to 500 μm,
   B2 0.2 to 10 μm insofar as an adhesive is used and 5 to 500 μm insofar as a connecting layer is used,
   D: 1 to 50 μm,
   E: 50 to 100 μm,
   B3: 0.2 to 10 μm insofar as an adhesive layer is used,
   C2 5 to 500 μm.

4. The heat insulator according to claim 1 in which at least individual layers of the casing are stretched.

5. The heat insulator according to claim 1 in which layer A of the casing is biaxially stretched.

6. The heat insulator according to claim 1 in which layers B1 and B3 of the casing consist essentially of a two-component polyurethane adhesive.

* * * * *